UNITED STATES PATENT OFFICE.

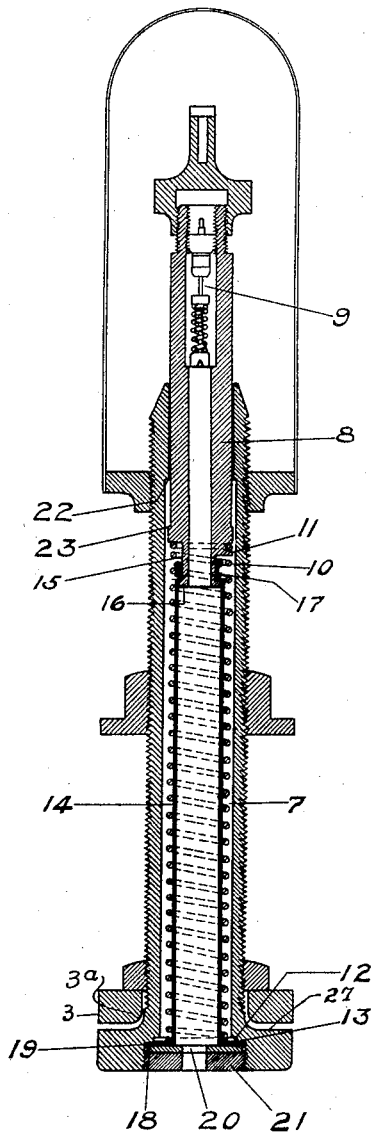

ISIDORE PULVERMAN, OF WARREN, PENNSYLVANIA.

TIRE VALVE AND GAGE.

1,386,074.      Specification of Letters Patent.      Patented Aug. 2, 1921.

Application filed April 21, 1919. Serial No. 291,567.

*To all whom it may concern:*

Be it known that I, ISIDORE PULVERMAN, a citizen of the United States, residing at Warren, in the county of Warren and State of Pennsylvania, have invented new and useful Improvements in Tire Valves and Gages, of which the following is a specification.

The tire valve and gage is intended for use with pneumatic tires and pneumatic tubes and is permanently attached thereto and forms the function of the ordinary tire valve and also indicates the pressure in the tire.

The invention is illustrated in the accompanying drawings as follows:—

Figure 1 shows a central section through the device.

Fig. 2 an elevation.

1 marks the tire tube, 2 the end plate or tube engaging shoulder, 3 the clamping washer, 4 the clamping nut, 5 the screw-threaded sleeve and 6 a nut for securing the tube in place on the felly. So far as described these parts operate in the usual manner.

The sleeve 5 has a central opening 7 in which a valve stem 8 which is extended in the form of a plunger, is telescopically mounted, the valve stem having the usual valve 9; a spring 10 is secured to the plunger end of the valve stem, the valve stem being provided with a stepped projection having a small but deep groove formed by a shoulder 11 for facilitating the securing of the spring. The groove is sufficiently deep and the engaging face of the shoulder is so directioned as to positively engage the spring. This permits of a secure attachment of the spring using but a single coil of the spring in portions of the circumference and thus make available space for a greater length of effective spring. The opposite end of the spring is secured to a plate 12 which seats in a socket 13 in the plate or tube engaging shoulder 2 at the end of the sleeve. A sleeve or tube 14 of elastic material, ordinarily rubber, extends over the lower end of the valve stem, the stepped projection at the lower end of the valve stem being reduced in size at 15 for this purpose and having a small bead 16 on its end forming a rounded groove back of the bead. The end of the rubber tube is preferably formed as shown to conform to the shape of the end of the projection and extends over the bead 16 into the groove 16. The rubber has a bead around its end and a thread 17 is wound around the exterior surface of the tube between the bead at the end of the tube and the bead on the projection, thus firmly securing the rubber on the end of the stem. The binding thread occupies the space formed by the reduction in the size of the rubber in the tube. This method of fastening makes a secure attachment without danger of cutting the rubber. The lower end of the rubber tube is provided with an outwardly extending flange 18 which extends onto a face 19 on the floor of the socket 13 so that the rubber flange entirely covers the joints in the floor of the socket 13 and seals this opening. A perforated plate 20 operates against the flange to clamp it against the seat and a perforated screw 21 is screwed into the socket against the plate 20 so as to firmly clamp the flange of rubber and also the plate 12 in place.

The upper end of the opening 7 is slightly smaller than the body of the sleeve 5 forming a shoulder 22 and the bottom of the stem has a shoulder 23 so that in case there is a breakage of the spring the discharge of the stem is prevented.

The stem is graduated at 24 so as to show the pressure and is preferably covered by a transparent case 25 which is mounted on a nut 26 screwed to the stem or sleeve 5.

In the operation of the device the tire is inflated by air introduced through the valve stem in the usual manner. As the pressure increases this pressure acting against the valve stem forces it outwardly, the spring 14 resisting this outward movement and the rubber sleeve assisting in this resistance. The extent of the outward movement of the stem indicates the pressure. For convenience a scale may be provided.

It will be observed that the rubber tube while it permits of the endwise movement of the same with the pressure thoroughly seals the air channel so as to prevent any leakage. This is a matter of great importance in devices of this character as even a very minute leak is fatal to the success of the device.

It will be observed that the base of the stem at its connection with the shoulder 2 has a curved strengthening portion 27 and that the plate 3 has a curved portion 3ª corresponding to the curved portion 27. The tube as it is clamped between the parts takes this curve so that a perfect seal with the tube is accomplished. The important feature of this is that the fillet or curvature 27 strengthens the base of the sleeve particularly with relation to the socket so that it is capable of withstanding the strain to which the sleeve is exposed when the tire becomes deflated or the locking devices commonly used in connection with the tire are deficient so that strain is put on the sleeve.

What I claim as new is:—

1. In a tire valve and gage, the combination of a sleeve having a tube engaging shoulder at its inner end with a screw threaded socket therein; a valve stem containing a valve telescopically mounted in the sleeve; an expansible tubular element comprising a rubber tube secured to the end of the stem and a coil spring outside of the tube secured to the stem; means arranged in the socket for securing the opposite end of the coil spring; a flange on the rubber tube extending over the floor of the socket to form a seal against the entrance of air to the sleeve outside the tube; and devices for clamping the flange in the socket.

2. In a tire valve and gage, the combination of a sleeve having a screw threaded exterior surface; means for securing the sleeve to a tire tube including a nut on the screw threaded surface, a valve stem having an opening extending axially therethrough, and a valve therein checking the outflow of air through said opening, said stem having a plunger extension telescopically mounted within the sleeve and indicating by its movement past the end of the sleeve the tire pressure, said plunger having a stepped projection, the projection having a groove formed by a securing shoulder; a tubular element extending from the plunger within the sleeve and comprising a coil spring and rubber tube within the spring secured to said projection, the rubber tube being formed with a beaded end and a reduced portion arranged in the groove; a binding means in the reduced portion whereby the tube is firmly secured to the projection, the reduced portion of the tube giving space for the binding means; and means for anchoring the end of the tubular element opposite the end secured to the plunger to the sleeve.

3. In a tire valve and gage, the combination of a sleeve having a screw threaded exterior surface; means for securing the sleeve to a tire tube including a nut on the screw threaded surface, a valve stem having an opening extending axially therethrough, and a valve therein checking the outflow of air through said opening, said stem having a plunger extension telescopically mounted within the sleeve and indicating by its movement past the end of the sleeve the tire pressure, said plunger having a stepped projection, the projection having two engaging surfaces, one of slightly larger diameter than the other, the surface having the larger diameter having a groove; a tubular element extending from the plunger within the sleeve and comprising a coil spring and rubber tube within the spring, the spring and tube being secured to the engaging surfaces of the projection, the groove receiving a convolution of the spring and the wall of the groove at the side toward the inner end of the stem having an engaging surface at right angles to the axis of the stem and extending radially a sufficient distance to engage a surface of the coil at right angles to the axis, and the tube being secured to the engaging surface of the projection of smaller diameter whereby the body of the element comprising the spring and tube may occupy the full space within the sleeve; and means for anchoring the end of the tubular element opposite the end secured to the plunger to the sleeve.

4. In a tire valve and gage, the combination of a sleeve having a tube engaging shoulder at its inner end, having a reduced portion forming a shoulder at its outer end; means for securing said sleeve to a tube; a valve stem containing a valve telescopically mounted in the sleeve and having a shoulder adapted to engage the shoulder formed by the reduced portion of the sleeve; an expansible tube connected to the stem; a spring element arranged over the expansible tube and secured to the stem; means for securing and sealing the opposite end of the expansible tube; and means for securing the opposite end of the spring, said sleeve having an opening through its inner end of a size to permit the assembling of the stem, spring, tube and means from the inner end of the sleeve.

In testimony whereof I have hereunto set my hand.

ISIDORE PULVERMAN.